United States Patent
Behera et al.

(10) Patent No.: US 12,235,734 B2
(45) Date of Patent: Feb. 25, 2025

(54) FILE BACKUP INTO AN OBJECT STORAGE BUCKET

(71) Applicant: Dell Products L.P., Round Rock, TX (US)

(72) Inventors: Narayan Behera, Pune (IN); Deepak Ratnaparkhi, Pune (IN); Sameer Mohod, Pune (IN); Anurag Chandra, Pune (IN)

(73) Assignee: DELL PRODUCTS L.P., Round Rock, TX (US)

( * ) Notice: Subject to any disclaimer, the term of this patent is extended or adjusted under 35 U.S.C. 154(b) by 10 days.

(21) Appl. No.: 18/357,041

(22) Filed: Jul. 21, 2023

(65) Prior Publication Data

US 2025/0028608 A1    Jan. 23, 2025

(51) Int. Cl.
*G06F 3/06*      (2006.01)
*G06F 11/14*     (2006.01)
*G06F 16/182*    (2019.01)

(52) U.S. Cl.
CPC ........ *G06F 11/1464* (2013.01); *G06F 16/183* (2019.01)

(58) Field of Classification Search
CPC ............. G06F 11/1435; G06F 11/1441; G06F 11/1471; G06F 16/11; G06F 16/2358; G06F 16/285; G06F 16/907; G06F 16/951
See application file for complete search history.

(56) References Cited

U.S. PATENT DOCUMENTS

2010/0280995 A1* 11/2010 Munegowda ......... G06F 16/907
                                                                707/648

* cited by examiner

*Primary Examiner* — Yong J Choe
(74) *Attorney, Agent, or Firm* — Amin, Turocy & Watson, LLP

(57) ABSTRACT

A system can maintain first data as files and second data as objects. The system can receive a request from a remote computer to convert a file into an object. The system can receive, from a file storage protocol mount point associated with the remote computer, first metadata for the file. The system can receive, from an object storage protocol client associated with the remote computer, second metadata for an object storage bucket of the second data, wherein data of the file is to be stored as the object in the object storage bucket. The system can copy the data of the file into the object in the object storage bucket, based on the first metadata for the file, based on the second metadata for the object storage bucket, and independently of transferring the data of the file to the object storage bucket via the remote computer.

20 Claims, 11 Drawing Sheets

800 ↘

(802)

↓

MAINTAINING FIRST DATA AS FILES, AND SECOND DATA AS OBJECTS 804

↓

RECEIVING A REQUEST FROM A REMOTE COMPUTER TO CONVERT A FILE OF THE FIRST DATA INTO AN OBJECT THAT IS STORED WITH THE SECOND DATA 806

↓

RECEIVING, FROM A FILE STORAGE PROTOCOL MOUNT POINT ASSOCIATED WITH THE REMOTE COMPUTER, METADATA FOR THE FILE 808

↓

RECEIVING, FROM AN OBJECT STORAGE PROTOCOL CLIENT ASSOCIATED WITH THE REMOTE COMPUTER, METADATA FOR AN OBJECT STORAGE BUCKET OF THE SECOND DATA, WHEREIN DATA OF THE FILE IS TO BE STORED AS THE OBJECT IN THE OBJECT STORAGE BUCKET 810

↓

COPYING THE DATA OF THE FILE INTO THE OBJECT IN THE OBJECT STORAGE BUCKET, BASED ON THE METADATA FOR THE FILE, BASED ON THE METADATA FOR THE OBJECT STORAGE BUCKET, AND INDEPENDENTLY OF TRANSFERRING THE DATA OF THE FILE TO THE OBJECT STORAGE BUCKET VIA THE REMOTE COMPUTER 812

COMPARING THE METADATA FOR THE FILE WITH THE METADATA FOR THE OBJECT STORAGE BUCKET TO DETERMINE WHETHER THE FIRST DATA AND THE SECOND DATA ARE STORED ON A SAME COMPUTER 904

↓

IN RESPONSE TO DETERMINING THAT THE FIRST DATA AND THE SECOND DATA ARE STORED ON THE SAME COMPUTER, COPYING THE DATA OF THE FILE INTO THE OBJECT IN THE OBJECT STORAGE BUCKET USING A SERVER-SPECIFIC COPY SERVICE 906

↓

IN RESPONSE TO DETERMINING THAT THE FIRST DATA AND THE SECOND DATA ARE STORED ON DIFFERENT COMPUTERS, COPYING THE DATA OF THE FILE INTO THE OBJECT IN THE OBJECT STORAGE BUCKET USING A REMOTE COPY SERVICE 908

FILE BACKUP INTO AN OBJECT STORAGE BUCKET

BACKGROUND

Computer systems can store data in various forms, such as files and/or objects.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can maintain first data as files. The system can maintain second data as objects. The system can receive a request from a remote computer to convert a file of the first data into an object that is stored with the second data. The system can receive, from a file storage protocol mount point associated with the remote computer, first metadata for the file. The system can receive, from an object storage protocol client associated with the remote computer, second metadata for an object storage bucket of the second data, wherein data of the file is to be stored as the object in the object storage bucket. The system can copy the data of the file into the object in the object storage bucket, based on the first metadata for the file, based on the second metadata for the object storage bucket, and independently of transferring the data of the file to the object storage bucket via the remote computer.

An example method can comprise maintaining, by a system comprising a processor, first data as files, and second data as objects. The method can further comprise receiving, by the system, a request from a remote computer to convert a file of the first data into an object that is stored with the second data. The method can further comprise receiving, by the system and from a file storage protocol mount point associated with the remote computer, metadata for the file. The method can further comprise receiving, by the system and from an object storage protocol client associated with the remote computer, metadata for an object storage bucket of the second data, wherein data of the file is to be stored as the object in the object storage bucket. The method can further comprise copying, by the system, the data of the file into the object in the object storage bucket, based on the metadata for the file, based on the metadata for the object storage bucket, and independently of transferring the data of the file to the object storage bucket via the remote computer.

An example non-transitory computer-readable medium can comprise instructions that, in response to execution, cause a system comprising a processor to perform operations. These operations can comprise maintaining first computer data as files, and second computer data as objects. These operations can further comprise receiving a request from a remote computer to convert a file of the first computer data into an object that is stored with the second computer data. These operations can further comprise receiving, from a file storage protocol mount point associated with the remote computer, metadata for the file. These operations can further comprise receiving, from an object storage protocol client associated with the remote computer, metadata for an object storage bucket of the second computer data, wherein data of the file will be stored as the object in the object storage bucket. These operations can further comprise copying the data of the file into the object in the object storage bucket, based on the metadata for the file, based on the metadata for the object storage bucket.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 8 illustrates another example process flow that can facilitate file backup into an object storage bucket, in accordance with an embodiment of this disclosure;

FIG. 9 illustrates another example process flow that can facilitate file backup into an object storage bucket, in accordance with an embodiment of this disclosure;

DETAILED DESCRIPTION

Overview

Files can be stored in a network attached storage (NAS) file system on network file system (NFS) export(s) or server message block (SMB) share(s). While the examples described herein generally relate to NFS protocols, it can be appreciated that the present techniques can be applied to other types of file storage protocols.

Where these files from shared storage are to be backed up into an object storage bucket, on the same storage server or a different storage server, then those files can be read from exports/shares and then uploaded into an object storage bucket as objects through an external client.

That is, where a client serves both file and object input/output (I/O), an administrator can want to copy files from a NFS export into an object storage bucket in the form of objects. In this scenario, a storage system can need to read files from an export and then upload corresponding files into an object storage bucket through a client.

These scenarios can involve an external client being a facilitator for different I/O protocols with different utilities (e.g., an object storage client, or a NFS mount, were a mount or mount point can comprise a location within a local file system that a remote file system is mounted, and then accessed locally by addressing a file location relative to that mount point).

Consider a scenario where a client serves both file and object I/O, and a file is to be backed up into an object storage bucket on a storage server. It can be that the export is mounted into that client, and the file is uploaded from the mount point into the object storage bucket as an object through the object storage client utility.

In this scenario, the file can traverse through the client, so system resources and bandwidth can be consumed to interact and transfer the data through the external client to copy the file from the NFS export to the object storage bucket, which can be available on the same storage server or a different storage server.

Example Architectures

Figure 1:
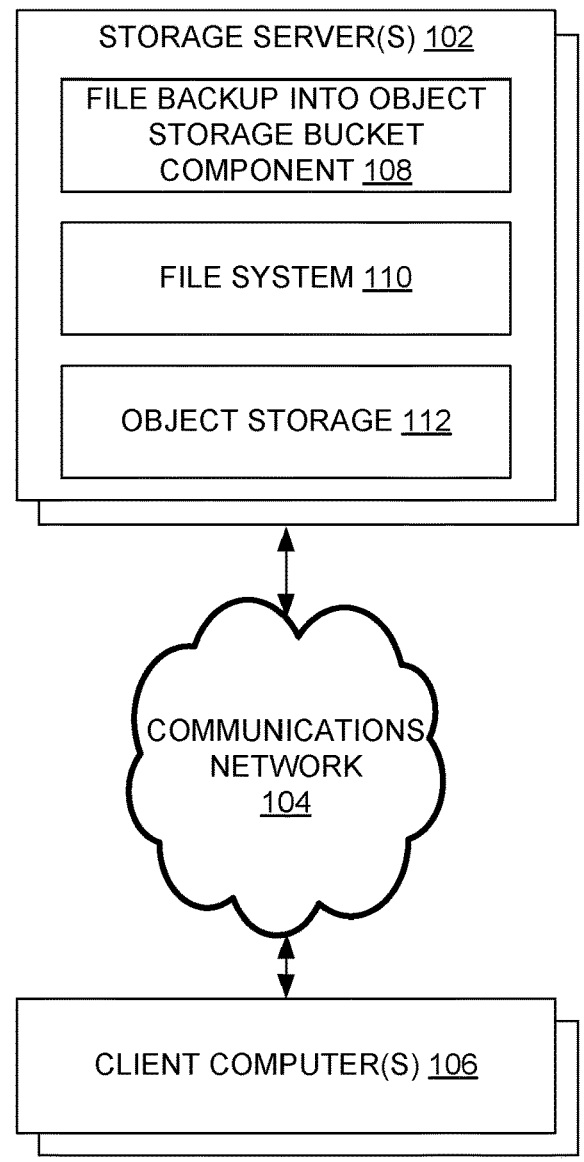
FIG. 1 illustrates an example system architecture that can facilitate file backup into an object storage bucket, in accordance with an embodiment of this disclosure.

FIG. 1 illustrates an example system architecture 100 that can facilitate file backup into an object storage bucket, in accordance with an embodiment of this disclosure.

System architecture 100 comprises storage server(s) 102, communications network 104, and client computer(s) 106. In turn, storage server(s) 102 comprises file backup into an object storage bucket component 108, file system 110, and object storage 112.

Figure 11:
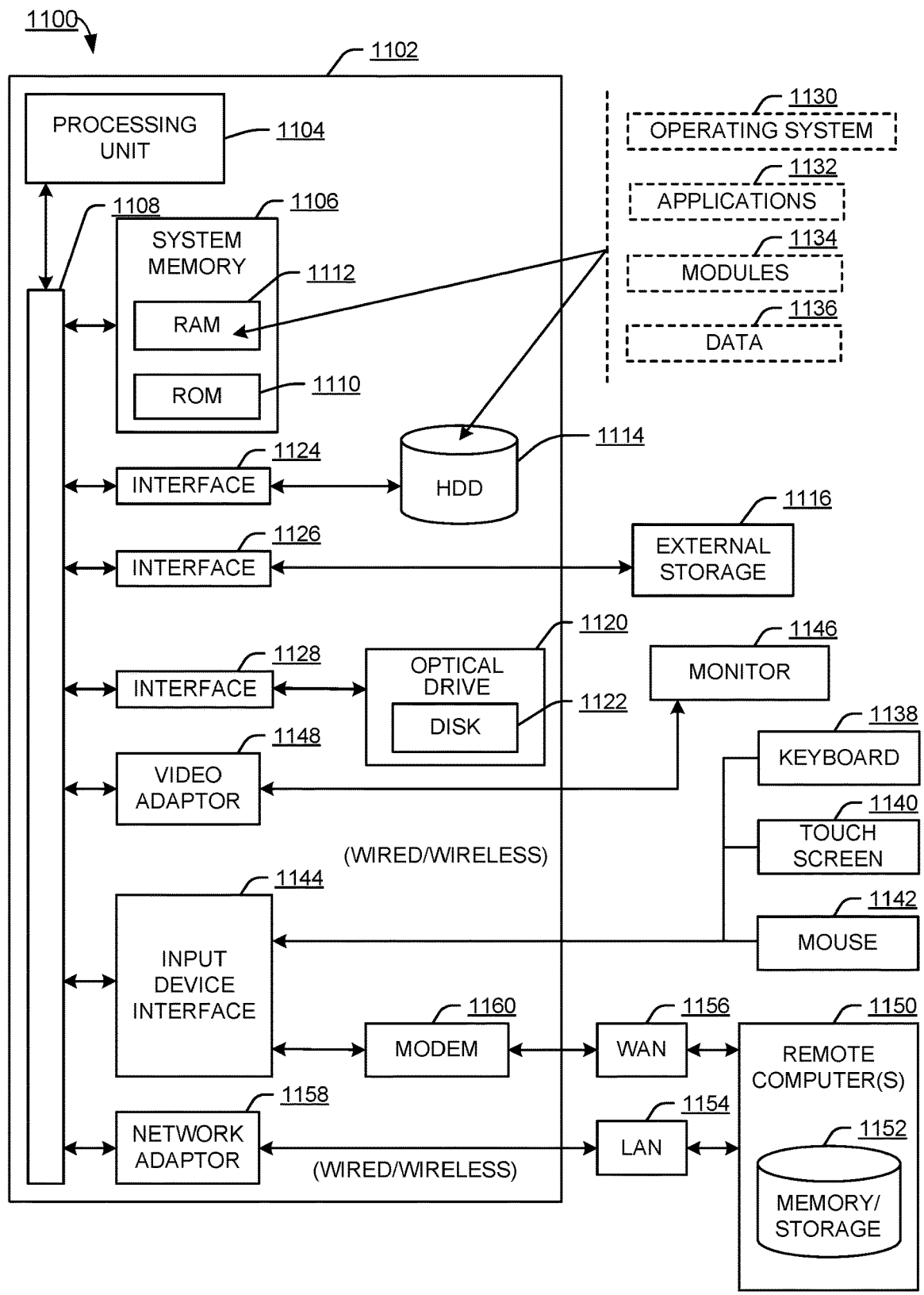
FIG. 11 illustrates an example block diagram of a computer operable to execute an embodiment of this disclosure.

Each of storage server(s) 102 and/or computer(s) 106 can be implemented with part(s) of computing environment 1100 of FIG. 11. Communications network 104 can comprise a computer communications network, such as the Internet.

Storage server(s) 102 can comprise one or more computers that are configured to store computer data. Different server instances of storage server(s) 102 can store data in different ways. For instance, one server instance can comprise an instance of file system 110 (where data is organized into a hierarchy of directories and stored as files within those directories), and another server instance can comprise an instance of object storage 112 (where data is organized into one or more flat address space that can be referred to as a bucket, and stored as objects within that bucket). Or, one server instance can comprise both an instance of file system 110 and object storage 112.

In some examples, storage server(s) can comprise a network attached storage (NAS) system, a storage area network (SAN) system, and/or a computing cluster.

Client computer(s) 106 can comprise one or more computer instances that are configured to access storage resources of storage server(s) via communications network 104. Where client computer(s) 106 accesses file system 110, client computer(s) 106 can do so via a NFS protocol, where client computer(s) 106 mount file system 110 such that it appears to applications of client computer(s) 106 to be local storage.

When client computer(s) 106 moves data from file system 110 to object storage 112, prior approaches can involve the data being sent from storage server(s) 102 to client computer(s) 106, and then back to storage server(s) 102. This can take time and consume network bandwidth compared to moving the data entirely within storage server(s) 102 (so the data does not pass through client computer(s) 106). In some examples, file backup into an object storage bucket component 108 can effectuate this moving of data entirely within storage server(s) 102 to facilitate file backup into an object storage bucket.

In some examples, file backup into an object storage bucket component 108 can implement part(s) of the process flows of FIGS. 6-10 to implement file backup into an object storage bucket.

It can be appreciated that system architecture 100 is one example system architecture for file backup into an object storage bucket, and that there can be other system architectures that facilitate file backup into an object storage bucket.

Figure 2:
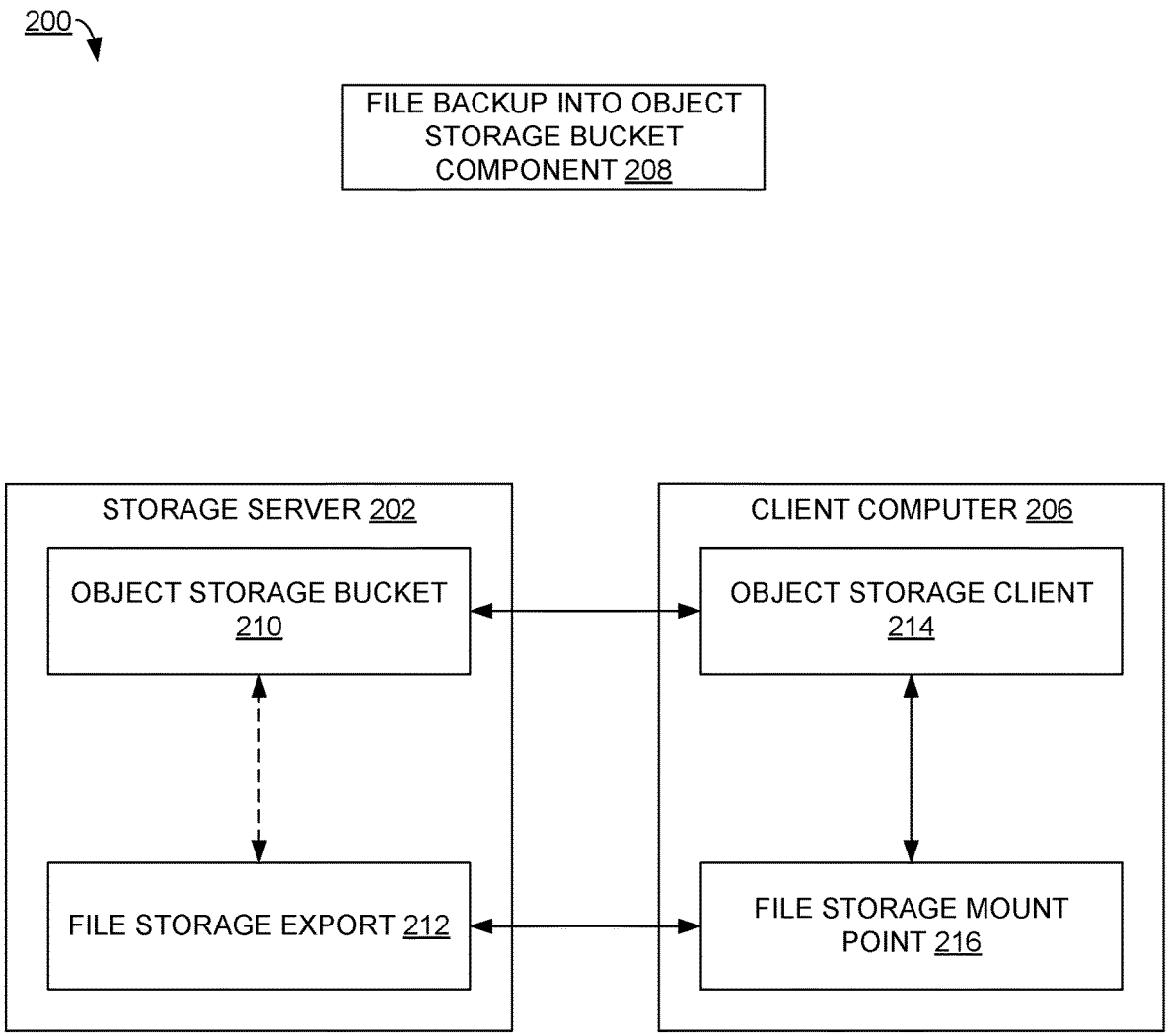
FIG. 2 illustrates an example system architecture of one client and one storage server, and that can facilitate file backup into an object storage bucket, in accordance with an embodiment of this disclosure.

FIG. 2 illustrates an example system architecture 200 of one client and one storage server, and that can facilitate file backup into an object storage bucket, in accordance with an embodiment of this disclosure. In some examples, part(s) of system architecture 200 can be used to implement part(s) of system architecture 100 to facilitate file backup into an object storage bucket.

System architecture 200 comprises storage server 202 (which can be similar to an instance of storage server(s) 102 of FIG. 1), client computer 206 (which can be similar to an instance of client computer(s) 106), object storage bucket 210 (which can be similar to object storage 112), file storage export 212 (which can be similar to file system 110, and which can comprise a NFS export), object storage client 214 (which can comprise a program executed by client computer 206 and used to access data of object storage bucket 210), and file storage mount point 216 (which can comprise a NFS mount point that is used by client computer 206 to access data of file storage export 212).

In an example scenario, file storage export 212 and object storage bucket 210 are both present in the same storage server (storage server 202) and are serving I/O through the same client (client computer 206). According to prior approaches, when a file (inside file storage export 212) needs to be backed up or moved to object storage bucket 210 within the same server (server 202), it can be that file movement can occur through client computer 206; and storage server 202 (which hosts both a file storage mount of file storage export 212, and object storage bucket 210) is not utilized.

In contrast to prior approaches, according to the present techniques, file backup into an object storage bucket component 208 (which can execute on storage server 202) can cause this copy to occur internally on storage server 202, so that data does not pass through client computer 206. This can save time and network bandwidth.

Figure 3:
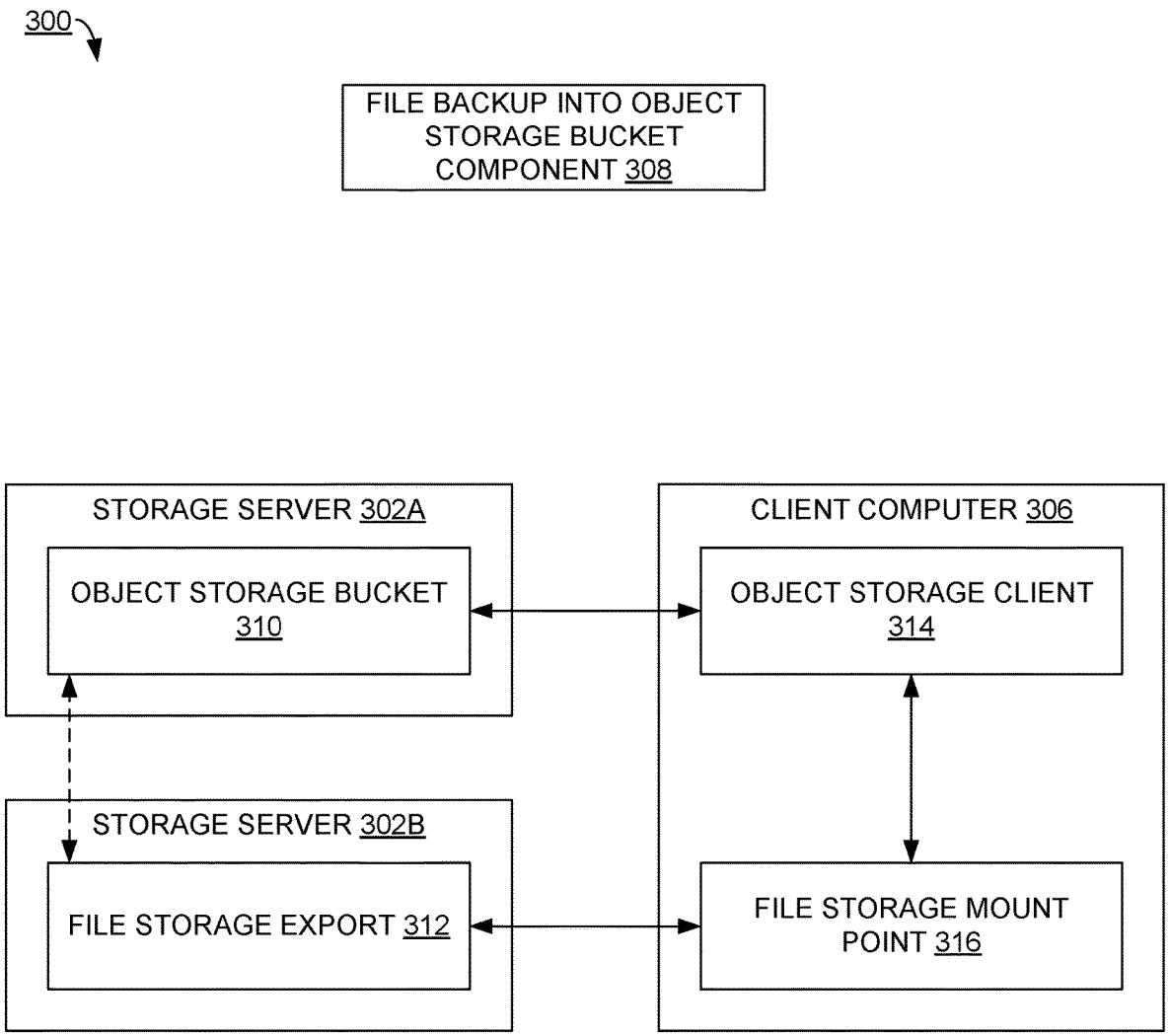
FIG. 3 illustrates an example system architecture of one client and two storage servers, and that can facilitate file backup into an object storage bucket, in accordance with an embodiment of this disclosure.

FIG. 3 illustrates an example system architecture 300 of one client and two storage servers, and that can facilitate file backup into an object storage bucket, in accordance with an embodiment of this disclosure. In some examples, part(s) of system architecture 300 can be used to implement part(s) of system architecture 100 to facilitate file backup into an object storage bucket.

System architecture 300 comprises storage server 302A (which can be similar to an instance of storage server(s) 102 of FIG. 1), storage server 302B (which can be similar to another instance of storage server(s) 102), client computer 306 (which can be similar to an instance of client computer(s) 106), object storage bucket 310 (which can be similar to object storage bucket 210 of FIG. 2), file storage export 312 (which can be similar to file storage export 212), object storage client 314 (which can be similar to object storage client 214), and file storage mount point 316 (which can be similar to file storage mount point 216).

Relative to example the scenario of FIG. 2, in another scenario, a NFS export and object storage bucket are both present in a different storage server (e.g., storage server 302A hosts object storage bucket 310, and storage server 302B hosts file storage export 312), and are serving I/O through the same client (client computer 306). According to prior approaches, when a file (inside file storage export 312) is backed up or moved to an object storage bucket on a different storage server (object storage bucket 310 on storage server 302A), it can be that file movement happens through client computer 306; and the storage server(s) that can be connected to each other via a replication technique are not utilized. That is, it can be that storage server 302A and storage server 302B are connected to each other via a replication technique, though this connection is not used for the data transfer.

In contrast to prior approaches, according to the present techniques, file backup into an object storage bucket component 308 (which can execute on storage server 302A and/or storage server 302B) can cause this copy to occur directly between storage server 302A and storage server 302B, so that data does not pass through client computer 306. This can save time and network bandwidth.

Figure 4:
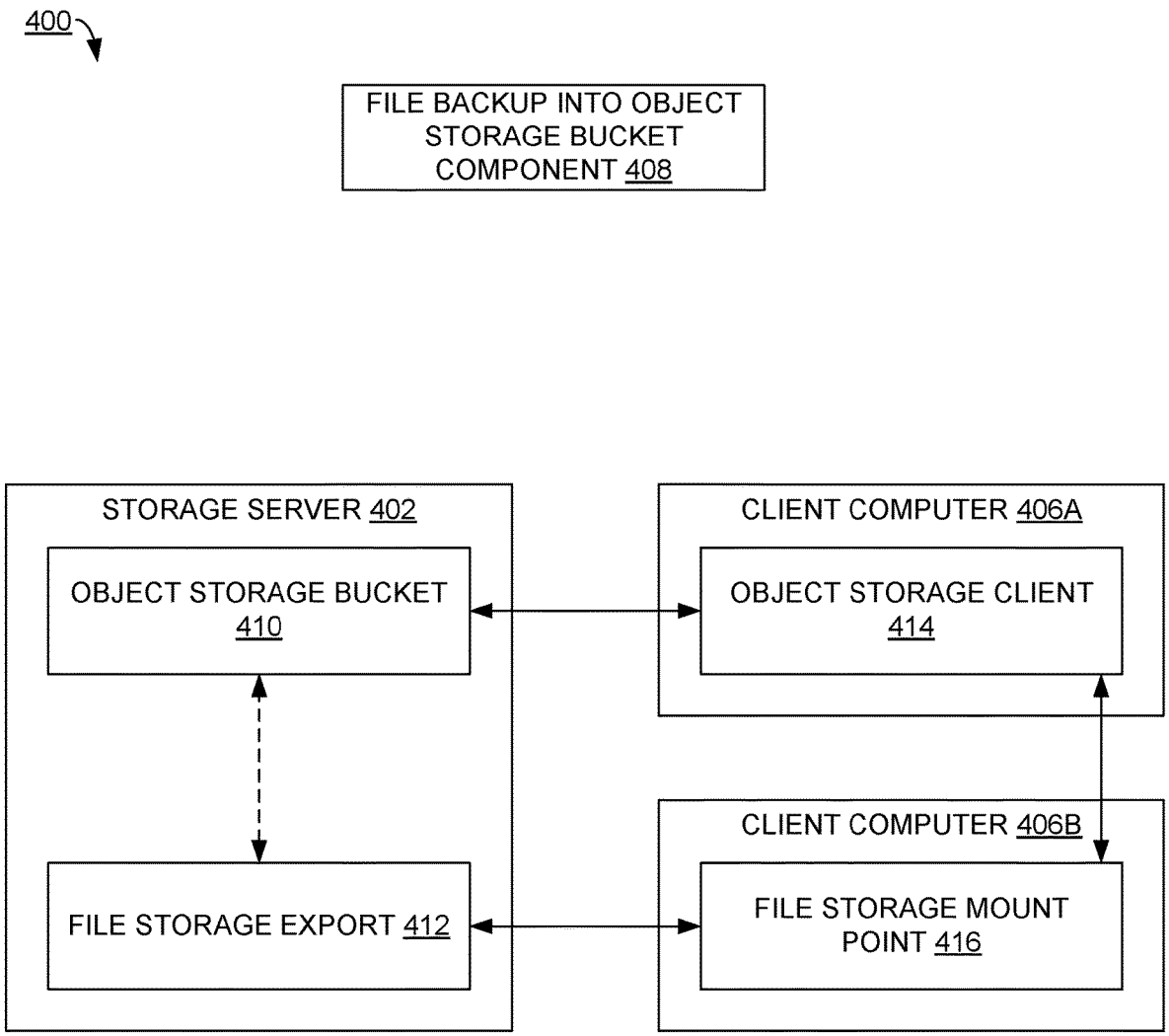
FIG. 4 illustrates an example system architecture of two clients and one storage server, and that can facilitate file backup into an object storage bucket, in accordance with an embodiment of this disclosure.

FIG. 4 illustrates an example system architecture 400 of two clients and one storage server, and that can facilitate file backup into an object storage bucket, in accordance with an embodiment of this disclosure. In some examples, part(s) of system architecture 400 can be used to implement part(s) of system architecture 100 to facilitate file backup into an object storage bucket.

System architecture 400 comprises storage server 402 (which can be similar to an instance of storage server(s) 102 of FIG. 1), client computer 406A (which can be similar to an instance of client computer(s) 106), client computer 406B (which can be similar to an instance of client computer(s) 106), object storage bucket 410 (which can be similar to object storage bucket 210 of FIG. 2), file storage export 412 (which can be similar to file storage export 212), object storage client 414 (which can be similar to object storage client 214), and file storage mount point 416 (which can be similar to file storage mount point 216).

Relative to the example scenarios of FIGS. 2-3, in another scenario, object storage bucket 410 and file storage export 412 are both present in the same storage server (server 402), and are serving I/O through two different clients (client computer 406A for object I/O and client computer 406B for file I/O). For example, there can be two external clients, each serving object storage I/O and file I/O, respectively. A file from file storage export 412 point can be backed up into object storage bucket 410 through these external clients. According to prior approaches, a file copy process can traverse through these two external clients that serve the NFS I/O and object storage I/O, respectively, and finally a file can be copied into an object storage bucket. It can be that the storage server (which hosts both the NFS mount and the object storage bucket) is not utilized for copying the file, though the file copy does not depend on the external client.

In contrast to prior approaches, according to the present techniques, file backup into an object storage bucket component 408 (which can execute on storage server 402) can cause this copy to occur internally on storage server 402, so that data does not pass through client computer 406A and client computer 406B. This can save time and network bandwidth.

Figure 5:
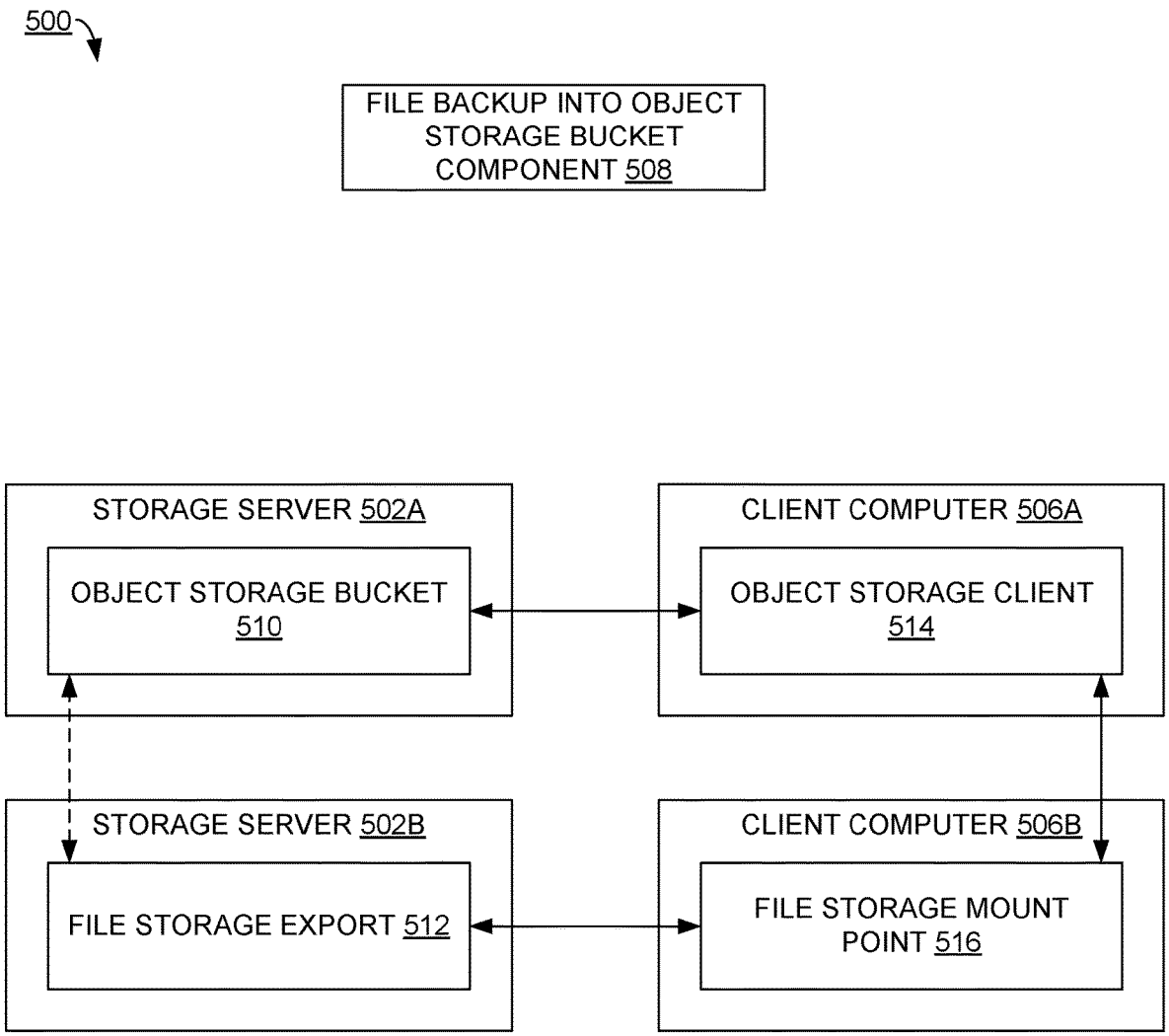
FIG. 5 illustrates an example system architecture of two clients and two storage servers, and that can facilitate file backup into an object storage bucket, in accordance with an embodiment of this disclosure.

FIG. 5 illustrates an example system architecture 500 of two clients and two storage servers, and that can facilitate file backup into an object storage bucket, in accordance with an embodiment of this disclosure.

System architecture 500 comprises storage server 502A (which can be similar to an instance of storage server(s) 102 of FIG. 1), storage server 502B (which can be similar to an instance of storage server(s) 102 of FIG. 1), client computer 506A (which can be similar to an instance of client computer(s) 106), client computer 506B (which can be similar to an instance of client computer(s) 106), object storage bucket 510 (which can be similar to object storage bucket 210 of FIG. 2), file storage export 512 (which can be similar to file storage export 212), object storage client 514 (which can be similar to object storage client 214), and file storage mount point 516 (which can be similar to file storage mount point 216).

Relative to the example scenarios of FIGS. 2-4, in another scenario, the file system export and the object storage bucket can both be present in different storage servers (server 502A for object storage bucket 510, and server 502B for file storage export 512), where I/O is served through two different clients (client computer 506A and client computer 506B). In this scenario, there can be two external clients, and each is served object storage I/O and NFS I/O, respectively. A file from a file storage mount point can be backed up into the object storage bucket through these external clients. According to prior approaches, a file copy process can traverse through these two external clients that serve file storage I/O and object storage I/O, respectively, and finally the file can be copied into the object storage bucket. It can be that the storage server(s) that can be connected to each other via a replication technique are not utilized for copying the file.

In contrast to prior approaches, according to the present techniques, file backup into an object storage bucket component 508 (which can execute on storage server 502A and/or 502B) can cause this copy to directly between storage server 502A and storage server 502B, so that data does not pass-through client computer 506A and client 502B. This can save time and network bandwidth.

Example Process Flows

Figure 6:
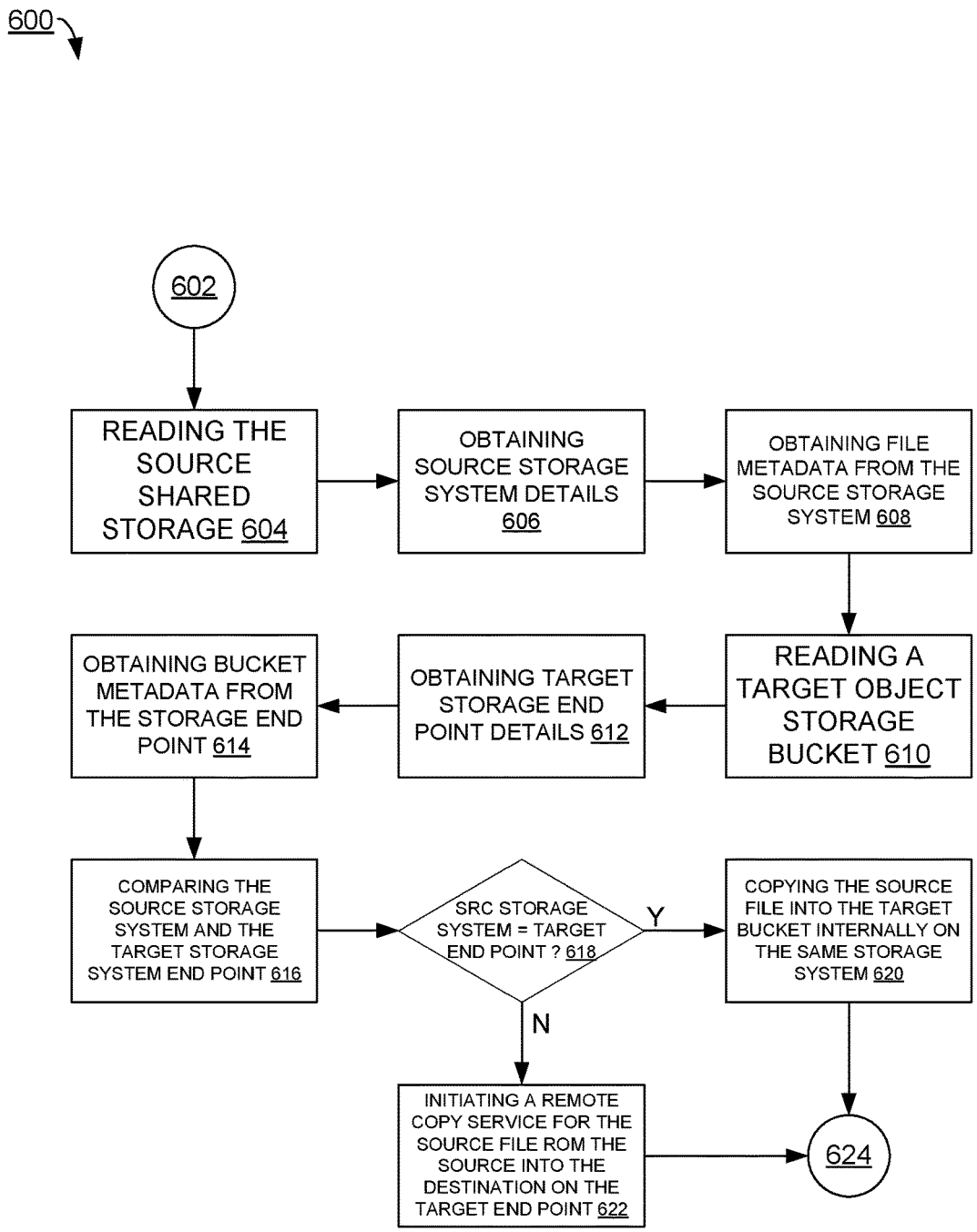
FIG. 6 illustrates an example process flow that can facilitate file backup into an object storage bucket, in accordance with an embodiment of this disclosure.

FIG. 6 illustrates an example process flow 600 that can facilitate file backup into an object storage bucket, in accordance with an embodiment of this disclosure. In some examples, one or more embodiments of process flow 600 can be implemented by file backup into an object storage bucket component 108 of FIG. 1, or computing environment 1100 of FIG. 11.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 700 of FIG. 7, process flow 800 of FIG. 8, process flow 900 of FIG. 9, and/or process flow 1000 of FIG. 10.

Process flow 600 starts at 602, and moves to operation 604.

Operation 604 depicts reading the source shared storage. In some examples, this can be a NFS mount path that stores data as files.

After operation 604, process flow 600 moves to operation 606.

Operation 606 depicts obtaining source storage system details. This can comprise information such as a network address of the source storage system or a Domain Name System (DNS) name of the source storage system.

After operation 606, process flow 600 moves to operation 608.

Operation 608 depicts obtaining file metadata from the source storage system. This file metadata can comprise a location/path (e.g., a directory/folder path where the file is stored in the file system) of the file.

After operation 608, process flow 600 moves to operation 610.

Operation 610 depicts reading a target object storage bucket. In some examples, this can be performed from an object storage client.

After operation 610, process flow 600 moves to operation 612.

Operation 612 depicts obtaining target storage end point details. This can comprise information such as a network address of the target storage endpoints or a DNS name of the target storage end points.

After operation 612, process flow 600 moves to operation 614.

Operation 614 depicts obtaining bucket metadata from the storage end point. Bucket metadata can comprise a location/region of the bucket (e.g., bucket details where the file will store in the form of an object).

After operation 614, process flow 600 moves to operation 616.

Operation 616 depicts comparing the source storage system and the target storage system end point.

After operation 616, process flow 600 moves to operation 618.

Operation 618 depicts determining whether the source storage system and target end point are the same.

Where in operation 618 it is determined that the source storage system and target end point are the same, process flow 600 moves to operation 620. Instead, where in operation 618 it is determined that the source storage system and target end point are different, process flow 600 moves to operation 622.

Operation 620 is reached from operation 618 where it is determined that the source storage system and target end point are the same. Operation 620 depicts copying the source file into the target bucket internally on the same storage system.

After operation 620, process flow 600 moves to 624, where process flow 600 ends.

Operation 622 is reached from operation 618 where it is determined that the source storage system and target end point are different. Operation 622 depicts initiating a remote copy service for the source file from the source storage system into the destination object storage bucket on the target end point.

After operation 620, process flow 600 moves to 624, where process flow 600 ends.

Figure 7:
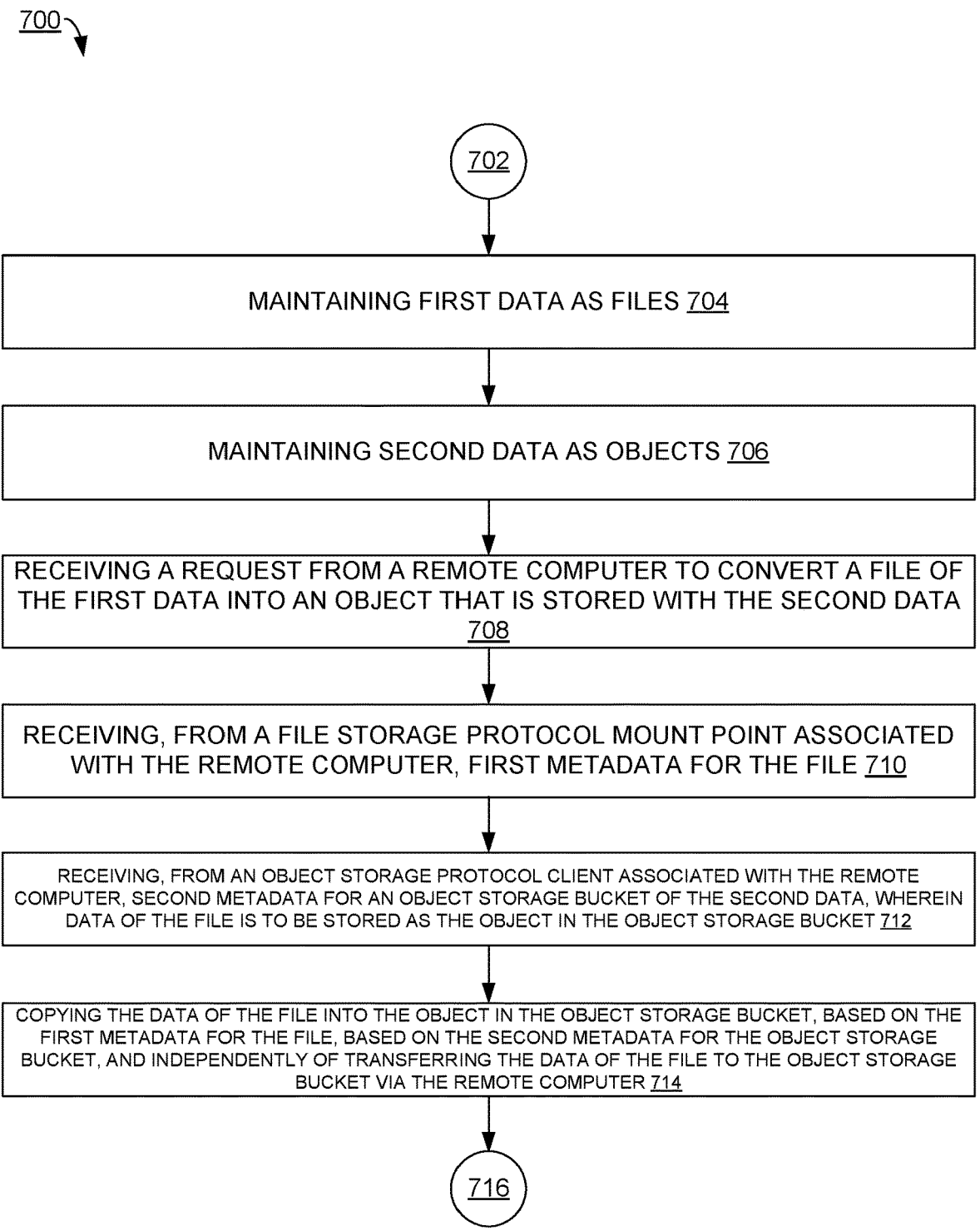
FIG. 7 illustrates another example process flow that can facilitate file backup into an object storage bucket, in accordance with an embodiment of this disclosure.

FIG. 7 illustrates another example process flow 700 that can facilitate file backup into an object storage bucket, in accordance with an embodiment of this disclosure. In some examples, one or more embodiments of process flow 700 can be implemented by file backup into an object storage bucket component 108 of FIG. 1, or computing environment 1100 of FIG. 11.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 600 of FIG. 6, process flow 800 of FIG. 8, process flow 900 of FIG. 9, and/or process flow 1000 of FIG. 10.

Process flow 700 begins with 702 and moves to operation 704.

Operation 704 depicts maintaining first data as files. In some examples, this can comprise storing data in file system 110 of FIG. 1.

After operation 704, process flow 700 moves to operation 706.

Operation 706 depicts maintaining second data as objects. In some examples, this can comprise storing data in object storage 112 of FIG. 1.

After operation 706, process flow 700 moves to operation 708.

Operation 708 depicts receiving a request from a remote computer to convert a file of the first data into an object that is stored with the second data. This can comprise an instance of computer(s) 106 of FIG. 1 sending storage server(s) 102 a request to move or copy data from file system 110 to object storage 112.

After operation 708, process flow 700 moves to operation 710.

Operation 710 depicts receiving, from a file storage protocol mount point associated with the remote computer, first metadata for the file. This file storage mount point can be file storage mount point 216 of FIG. 2.

In some examples, the first metadata for the file comprises a file path in the first data where the file is stored. That is, storage server details from an source mount path can be received from an external client, which indicate which files are to be transferred.

After operation 710, process flow 700 moves to operation 712.

Operation 712 depicts receiving, from an object storage protocol client associated with the remote computer, second metadata for an object storage bucket of the second data, wherein data of the file is to be stored as the object in the object storage bucket. This object storage protocol client can be object storage client 214 of FIG. 2.

In some examples, the second metadata for the object storage bucket comprises endpoint details of a storage endpoint that stores the object storage bucket. That is, details about the storage endpoint (e.g., its network address) can be obtained from an object storage client that executes on a client computer.

In some examples, the second metadata for the object storage bucket identifies a location of the object storage bucket within the storage endpoint. That is, the storage server can store metadata of the object storage bucket and this information can be retrieved from the storage server.

After operation 712, process flow 700 moves to operation 714.

Operation 714 depicts copying the data of the file into the object in the object storage bucket, based on the first metadata for the file, based on the second metadata for the object storage bucket, and independently of transferring the data of the file to the object storage bucket via the remote computer. That is, using the example of FIG. 1, data can be copied from file system 110 to object storage 112 internally within storage server(s) 102, and without data passing to and from client computer(s) 106.

In some examples, the first data is maintained on a first computer, wherein the second data is maintained on the first computer, wherein the remote computer executes the file storage protocol mount point, and wherein the remote computer executes the object storage protocol client. That is, a system architecture similar to system architecture 200 of FIG. 2 can be implemented.

In some examples, the first data is maintained on a first computer, wherein the second data is maintained on a second computer, wherein the remote computer executes the file storage protocol mount point, and wherein the remote computer executes the object storage protocol client. That is, a system architecture similar to system architecture 300 of FIG. 3 can be implemented.

In some examples, the remote computer is a first remote computer, wherein the first data is maintained on a first computer, wherein the second data is maintained on the first computer, wherein the first remote computer executes the file storage protocol mount point, and wherein a second remote computer executes the object storage protocol client. That is, a system architecture similar to system architecture 400 of FIG. 4 can be implemented.

In some examples, the remote computer is a first remote computer, wherein the first data is maintained on a first computer, wherein the second data is maintained on a second computer, wherein the first remote computer executes the file storage protocol mount point, and wherein a second remote computer executes the object storage protocol client. That is, a system architecture similar to system architecture 500 of FIG. 5 can be implemented.

In some examples, operation 714 comprises copying at least part of the first metadata for the file to the object storage bucket, independently of transferring the second metadata of the file to the object storage bucket via the remote computer. That is, it can be that metadata of the files being copied is stored on the storage server and can be retrieved from the storage server.

After operation 714, process flow 700 moves to 716, where process flow 700 ends.

FIG. 8 illustrates another example process flow 800 that can facilitate file backup into an object storage bucket, in accordance with an embodiment of this disclosure. In some examples, one or more embodiments of process flow 800 can be implemented by file backup into an object storage bucket component 108 of FIG. 1, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 600 of FIG. 6, process flow 700 of FIG. 7, process flow 900 of FIG. 9, and/or process flow 1000 of FIG. 10.

Process flow 800 begins with 802, and moves to operation 804.

Operation 804 depicts maintaining first data as files, and second data as objects. In some examples, operation 804 can be implemented in a similar manner as operations 704-706 of FIG. 7.

After operation 804, process flow 800 moves to operation 806.

Operation 806 depicts receiving a request from a remote computer to convert a file of the first data into an object that is stored with the second data. In some examples, operation 806 can be implemented in a similar manner as operation 708 of FIG. 7. After operation 806, process flow 800 moves to operation 808.

Operation 808 depicts receiving, from a file storage protocol mount point associated with the remote computer, metadata for the file. In some examples, operation 808 can be implemented in a similar manner as operation 710 of FIG. 7.

After operation 808, process flow 800 moves to operation 810.

Operation 810 depicts receiving, from an object storage protocol client associated with the remote computer, metadata for an object storage bucket of the second data, wherein data of the file is to be stored as the object in the object storage bucket. In some examples, operation 810 can be implemented in a similar manner as operation 712 of FIG. 7.

After operation 810, process flow 800 moves to operation 812.

Operation 812 depicts copying the data of the file into the object in the object storage bucket, based on the metadata for the file, based on the metadata for the object storage bucket, and independently of transferring the data of the file to the object storage bucket via the remote computer. In some examples, operation 812 can be implemented in a similar manner as operation 714 of FIG. 7.

After operation 812, process flow 800 moves to 814, where process flow 800 ends.

FIG. 9 illustrates another example process flow 900 that can facilitate file backup into an object storage bucket, in accordance with an embodiment of this disclosure. In some examples, one or more embodiments of process flow 900 can be implemented by file backup into an object storage bucket component 108 of FIG. 1, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 600 of FIG. 6, process flow 700 of FIG. 7, process flow 800 of FIG. 8, and/or process flow 1000 of FIG. 10.

Process flow 900 begins with 902, and moves to operation 904.

Operation 904 comprises comparing the metadata for the file with the metadata for the object storage bucket to determine whether the first data and the second data are stored on a same computer. That is, source storage server (of the file) and destination storage server (of the object storage) can be compared to determine whether they are the same storage server, or different storage servers.

After operation 904, process flow 900 moves to operation 906.

Operation 906 depicts, in response to determining that the first data and the second data are stored on the same computer, copying the data of the file into the object in the object storage bucket using a server-specific copy service. That is, where the target endpoint is same as the source storage server, the file can be copied from the source export into the target object storage internally on the same storage server. In some examples, storage server-specific copy services can be used to improve performance relative to other techniques.

In some examples, the metadata for the file comprises an external attribute for the file. In some system architectures, data can be stored in inodes, and an external attribute can comprise file metadata that is stored in a different inode than file data is stored.

After operation 906, process flow 900 moves to operation 908.

Operation 908 depicts, in response to determining that the first data and the second data are stored on different computers, copying the data of the file into the object in the object storage bucket using a remote copy service. That is, where the target endpoint is different from a source storage server, then the file can be copied from the source export into the target object storage with traditional copy service. In some examples, storage server-specific remote-copy services can be used to improve performance relative to other techniques.

After operation 908, process flow 900 moves to 910, where process flow 900 ends.

Figure 10:
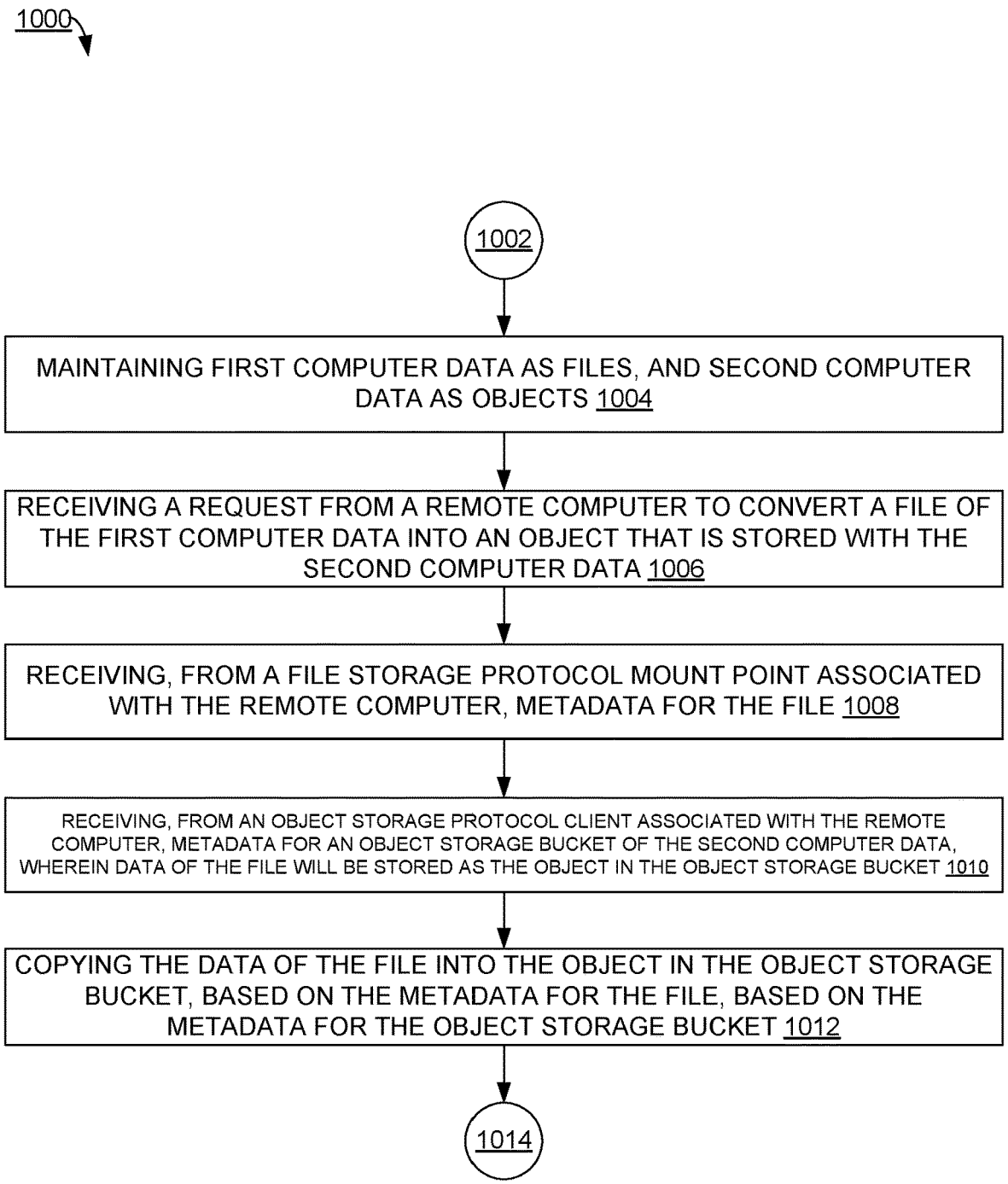
FIG. 10 illustrates another example process flow that can facilitate file backup into an object storage bucket, in accordance with an embodiment of this disclosure.

FIG. 10 illustrates another example process flow 1000 that can facilitate file backup into an object storage bucket, in accordance with an embodiment of this disclosure. In some examples, one or more embodiments of process flow 1000 can be implemented by file backup into an object storage bucket component 108 of FIG. 1, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 600 of FIG. 6, process flow 700 of FIG. 7, process flow 800 of FIG. 8, and/or process flow 900 of FIG. 9.

Process flow 1000 begins with 1002, and moves to operation 1004.

Operation 1004 depicts maintaining first computer data as files, and second computer data as objects. In some examples, operation 1004 can be implemented in a similar manner as operations 704-706 of FIG. 7.

After operation 1004, process flow 1000 moves to operation 1006.

Operation 1006 depicts receiving a request from a remote computer to convert a file of the first computer data into an object that is stored with the second computer data. In some examples, operation 1006 can be implemented in a similar manner as operation 708 of FIG. 7.

After operation 1006, process flow 1000 moves to operation 1008.

Operation 1008 depicts receiving, from a file storage protocol mount point associated with the remote computer, metadata for the file. In some examples, operation 1008 can be implemented in a similar manner as operation 710 of FIG. 7.

In some examples, the file storage protocol mount point adheres to a network file system protocol. In some examples, the file storage protocol mount point adheres to a server message block protocol. That is, the file storage protocol mount point can be part of a NFS export or a SMB share.

After operation 1008, process flow 1000 moves to operation 1010.

Operation 1010 depicts receiving, from an object storage protocol client associated with the remote computer, metadata for an object storage bucket of the second computer data, wherein data of the file will be stored as the object in the object storage bucket. In some examples, operation 1010 can be implemented in a similar manner as operation 712 of FIG. 7.

In some examples, the metadata for the object storage bucket comprises an internet protocol address for a computer that stores the object storage bucket. In some examples, the metadata for the object storage bucket comprises a domain name system name for a computer that stores the object storage bucket.

After operation 1010, process flow 1000 moves to operation 1012.

Operation 1012 depicts copying the data of the file into the object in the object storage bucket, based on the metadata for the file, based on the metadata for the object storage bucket. In some examples, operation 1012 can be implemented in a similar manner as operation 714 of FIG. 7.

In some examples, the copying is performed independently of transferring the data of the file to the object storage bucket via the remote computer. That is, a copy operation to move data between file storage and object storage can occur without sending data through a client.

After operation 1012, process flow 1000 moves to 1014, where process flow 1000 ends.

Example Operating Environment

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of storage server(s) 102, and/or client computer(s) 106 of FIG. 1.

In some examples, computing environment 1100 can implement one or more embodiments of the process flows of FIGS. 6-10 to facilitate file backup into an object storage bucket.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a nonvolatile storage such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
    maintaining first data as files;
    maintaining second data as objects;
    receiving a request from a remote computer to convert a file of the first data into an object that is stored with the second data;
    receiving, from a file storage protocol mount point associated with the remote computer, first metadata for the file;
    receiving, from an object storage protocol client associated with the remote computer, second metadata for an object storage bucket of the second data, wherein data of the file is to be stored as the object in the object storage bucket; and
    copying the data of the file into the object in the object storage bucket, based on the first metadata for the file, based on the second metadata for the object storage bucket, and independently of transferring the data of the file to the object storage bucket via the remote computer.

2. The system of claim 1, wherein the first data is maintained on a first computer, wherein the second data is maintained on the first computer, wherein the remote computer executes the file storage protocol mount point, and wherein the remote computer executes the object storage protocol client.

3. The system of claim 1, wherein the first data is maintained on a first computer, wherein the second data is maintained on a second computer, wherein the remote computer executes the file storage protocol mount point, and wherein the remote computer executes the object storage protocol client.

4. The system of claim 1, wherein the remote computer is a first remote computer, wherein the first data is maintained on a first computer, wherein the second data is maintained on the first computer, wherein the first remote computer executes the file storage protocol mount point, and wherein a second remote computer executes the object storage protocol client.

5. The system of claim 1, wherein the remote computer is a first remote computer, wherein the first data is maintained on a first computer, wherein the second data is maintained on a second computer, wherein the first remote computer executes the file storage protocol mount point, and wherein a second remote computer executes the object storage protocol client.

6. The system of claim 1, wherein the first metadata for the file comprises a file path in the first data where the file is stored.

7. The system of claim 1, wherein the operations further comprise:
copying at least part of the first metadata for the file to the object storage bucket, independently of transferring the second metadata of the file to the object storage bucket via the remote computer.

8. The system of claim 1, wherein the second metadata for the object storage bucket comprises endpoint details of a storage endpoint that stores the object storage bucket.

9. The system of claim 8, wherein the second metadata for the object storage bucket identifies a location of the object storage bucket within the storage endpoint.

10. A method, comprising:
maintaining, by a system comprising a processor, first data as files, and second data as objects;
receiving, by the system, a request from a remote computer to convert a file of the first data into an object that is stored with the second data;
receiving, by the system and from a file storage protocol mount point associated with the remote computer, metadata for the file;
receiving, by the system and from an object storage protocol client associated with the remote computer, metadata for an object storage bucket of the second data, wherein data of the file is to be stored as the object in the object storage bucket; and
copying, by the system, the data of the file into the object in the object storage bucket, based on the metadata for the file, based on the metadata for the object storage bucket, and independently of transferring the data of the file to the object storage bucket via the remote computer.

11. The method of claim 10, further comprising:
comparing, by the system, the metadata for the file with the metadata for the object storage bucket to determine whether the first data and the second data are stored on a same computer.

12. The method of claim 11, further comprising:
in response to determining that the first data and the second data are stored on the same computer, copying the data of the file into the object in the object storage bucket using a server-specific copy service.

13. The method of claim 11, further comprising:
in response to determining that the first data and the second data are stored on different computers, copying the data of the file into the object in the object storage bucket using a remote copy service.

14. The method of claim 10, wherein the metadata for the file comprises an external attribute for the file.

15. A non-transitory computer-readable medium comprising instructions that, in response to execution, cause a system comprising a processor to perform operations, comprising:
maintaining first computer data as files, and second computer data as objects;
receiving a request from a remote computer to convert a file of the first computer data into an object that is stored with the second computer data;
receiving, from a file storage protocol mount point associated with the remote computer, metadata for the file;
receiving, from an object storage protocol client associated with the remote computer, metadata for an object storage bucket of the second computer data; and
as part of storing data of the file as the object in the object storage bucket, copying the data of the file into the object in the object storage bucket, based on the metadata for the file, and based on the metadata for the object storage bucket.

16. The non-transitory computer-readable medium of claim 15, wherein the copying is performed independently of transferring the data of the file to the object storage bucket via the remote computer.

17. The non-transitory computer-readable medium of claim 15, wherein the metadata for the object storage bucket comprises an internet protocol address for a computer that stores the object storage bucket.

18. The non-transitory computer-readable medium of claim 15, wherein the metadata for the object storage bucket comprises a domain name system name for a computer that stores the object storage bucket.

19. The non-transitory computer-readable medium of claim 15, wherein the file storage protocol mount point adheres to a network file system protocol.

20. The non-transitory computer-readable medium of claim 15, wherein the file storage protocol mount point adheres to a server message block protocol.

* * * * *